Jan. 1, 1929.
A. A. WITZ
1,697,037
BALL JOINT
Filed June 29, 1925
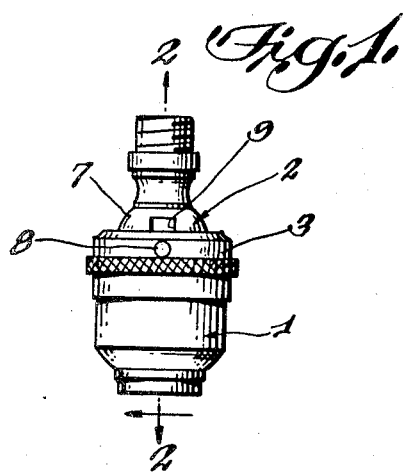
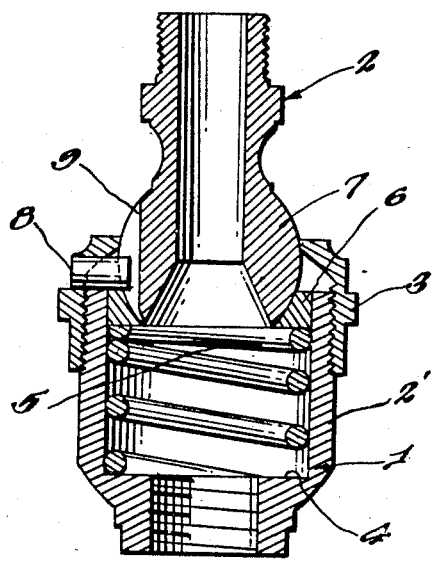
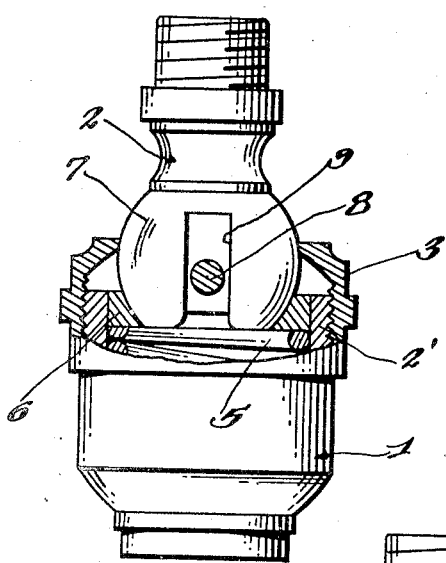
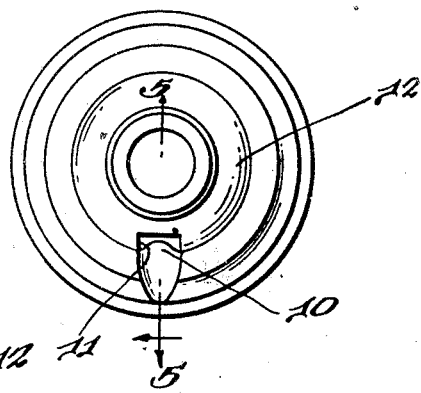
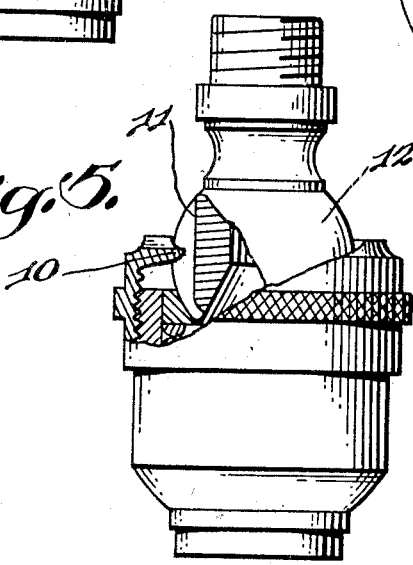
Albert A. Witz
INVENTOR.
BY Victor J. Evans
ATTORNEY Patented Jan. 1, 1929.

1,697,037

UNITED STATES PATENT OFFICE.

ALBERT A. WITZ, OF CHICAGO, ILLINOIS.

BALL JOINT.

Application filed June 29, 1925. Serial No. 40,467.

This invention relates to a ball joint and has for its primary object the construction of a ball joint that may be readily adjusted to any of its required positions but at the same time preventing movement of the ball in a direction that will subject electric wires to an unnecessary wearing action.

An object of the invention is that with the connection between the socket and ball the latter will be prevented from turning in a direction that will twist the electric wires that are passed therethrough.

Besides the above my invention is distinguished in the use of a ball and socket between which is arranged an element that will prevent the ball from being completely rotated in the socket which, when taking place, subjects the electric wires to an undue wearing action thereby shortening the life of the lighting unit.

With these and other objects in view, the invention will be better understood from the following description taken in connection with the accompanying drawings, wherein:

Fig. 1 is a side elevation of a ball joint constructed in accordance with my invention.

Fig. 2 is a sectional view on the line 2—2 of Fig. 1.

Fig. 3 is an enlarged side elevation showing certain parts in section.

Fig. 4 is a top plan view.

Fig. 5 is a sectional view on the line 5—5 of Fig. 4.

Again referring to the drawings illustrating one of the many constructions of my invention, the numeral 1 designates a socket member while the numeral 2 designates a ball member. The socket member 1 comprises the usual male member 2 and female member or collar 3 screwthreaded thereto. The male member 1 is provided with the shoulder 4 upon which rests a spring 5 that yieldingly engages the ring 6 that in turn frictionally engages the ball 7 of the ball member. The ring 6 engages the ball to one side of its center while the female member 3 engages the ball on the opposite side so that the ball is frictionally held to turn in any direction. For the purpose of preventing complete rotation of the ball so as to prevent twisting of the wires or undue wearing thereof I provide in one construction of my invention a pin 8 secured in the female member and engaging into a recess or groove 9 in the ball in a manner that the ball is prevented from completely turning in the socket but is free to be adjusted in any direction necessary to properly position the electric socket that is carried by the ball.

In Figures 4 and 5 I have shown another manner of limiting the movement of the ball. In this particular case a tongue 10 is struck from the inwardly projecting flange of the female member to be positioned in the recess 11 of the ball 12.

It is, of course, to be understood that the various parts may be constructed in various other ways than illustrated and various other forms of connections may be arranged between the ball and socket as the main purpose of my invention is to limit the movement of the ball in a predetermined direction and therefore I do not desire to be limited in any manner except as set forth in the claims hereunto appended.

Having thus described my invention, what I claim is:

1. In a ball and socket joint, a socket member, a retaining collar secured on the socket member and having an inwardly projecting retaining flange, a ring slidably mounted in the socket member at the end thereof adjacent said collar, an expansion spring confined between the ring and the other end of the socket member, said spring urging the ring toward the flange of the collar, and a ball member seating in the ring and confined between the ring and the collar of the flange, the ball member having a groove in its outer surface and the flange of the collar being struck down to form an element projecting into said groove.

2. A ball joint including a male and female member, the male member being provided with a groove, a ring providing a seat for the male member, a collar on the female member providing a flange co-operating with the ring for movably retaining the male member in the female member, said flange having a projecting portion thereon directed into the groove for limiting movement in one direction between the male and female member.

In testimony whereof I affix my signature.

ALBERT A. WITZ.